Nov. 17, 1964     J. M. DIMIN ETAL     3,157,219
SAFETY DEVICE FOR VENTING TIRES
Filed Sept. 22, 1958
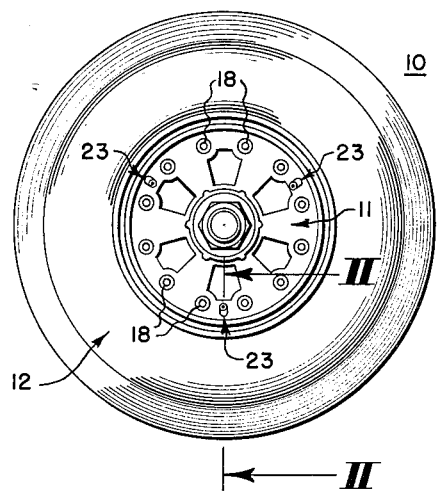
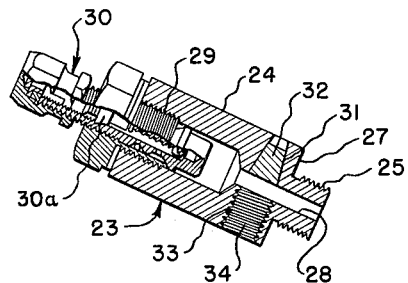
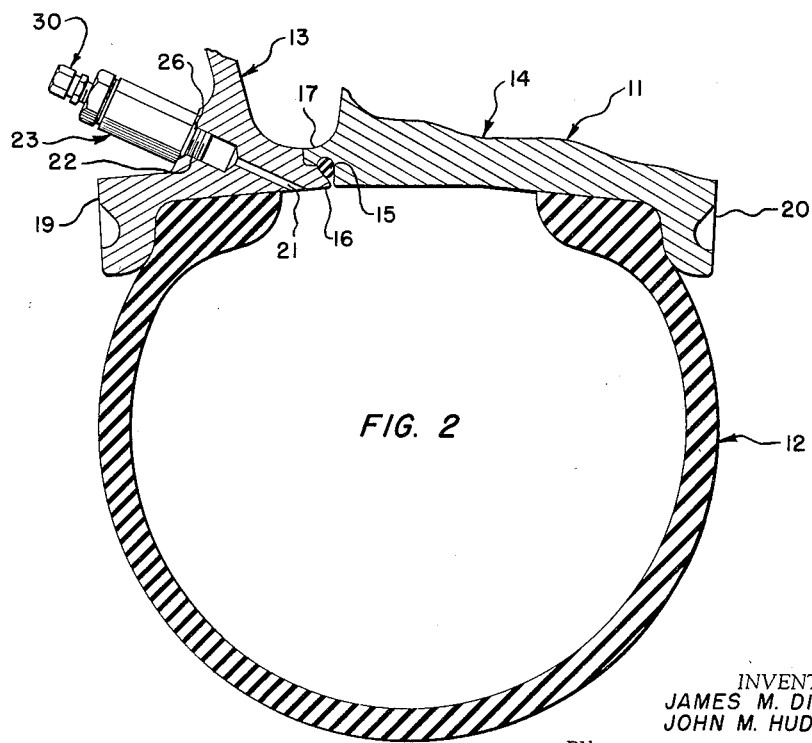
INVENTORS
JAMES M. DIMIN
JOHN M. HUDSON
BY
*Walter J. Jason*
ATTORNEY 3,157,219
SAFETY DEVICE FOR VENTING TIRES
James M. Dimin, Solana Beach, and John M. Hudson, San Diego, Calif., assignors to General Dynamics Corporation, San Diego, Calif., a corporation of Delaware
Filed Sept. 22, 1958, Ser. No. 762,513
6 Claims. (Cl. 152—427)

The present invention relates generally to safety devices for tires and more particularly to a fusible adapter to be associated with a wheel and tire to prevent blowouts by automatically releasing over pressurized and over heated air from within the tire.

Stopping of high speed aircraft within safe limits determined by the length of an airport runway requires that wheel brakes be of considerable horsepower and of large proportions. During severe braking applications the heat generated by the brakes is conducted into the tire mounted on the wheel. There have been numerous instances where tire blowouts occur from 15 to 25 minutes after the aircraft has been parked. This is due to the time necessary for the heat generated by the brake to pass by conduction to the wheel and into the tire. When the temperature of the tire exceeds the ultimate tensile strength of the cord material the air pressure ruptures the cord causing the tire to burst. Blowouts also have occurred during high speed taxi runs. In such cases the elevated temperature of the tires is a result of friction between the cord plies and friction between the tire and wheel rim.

The seriousness of a tire blowout is well recognized. A blowout occurring after the vehicle has been parked involves danger to unsuspecting maintenance personnel as well as to the airplane per se or the equipment employed to service the plane. Blowouts occurring after the plane is air borne after a fast landing and take-off have been known to cause considerable damage to the structure of the airplane since the landing gear is usually retracted into and housed in the fuselage and wings.

Blowouts attributable to an overheated or overpressurized tire may be eliminated by application of the fused adapter of the present invention to a usual wheel of the type designed to accommodate a tubeless tire.

Accordingly an object of the present invention is to provide a thermally controlled safety device for automatically venting the air from a vehicle tire before the tire becomes overheated.

Another object of this invention is to provide a novel fusible adapter for venting a tire, which adapter has a construction permitting ready replacement of the fusible element.

A further object of this invention lies in providing a novel fusible adapter which is readily associated with the usual tire inflation valve to act to control automatic venting of a tire.

Other objects and features of the present invention will be readily apparent to those skilled in the art from the following specification and appended drawings wherein is illustrated a preferred form of the invention, and in which:

FIGURE 1 is an elevational view of a tire and wheel assembly embodying the fusible adapter of the present invention.

FIGURE 2 is an enlarged fragmentary sectional view taken on the line II—II of FIGURE 1.

FIGURE 3 is an enlarged sectional view of the fusible adapter showing portions in elevation to facilitate illustration of this invention.

Having reference now to the drawings a tire and wheel assembly generally designated 10 comprises a conventional wheel 11 upon which a usual tubeless type tire 12 is mounted in the usual manner. Wheel 11 as shown in FIGURE 2 is of a type common to aircraft. Such wheels are of the split rim construction having an outer rim member 13 secured to an inner rim member 14 with a sealing member 15 positioned between interlocking flanges 16 and 17 respectively of outer member 13 and inner member 14. Bolts 18, as shown in FIGURE 1, spaced about the periphery wheel 11 adjacent the tire engaging flanges 19 and 20 secure outer and inner wheel rim members 13 and 14 together into a unitary structure. Rim members 13 and 14, when bolted together, cooperate in usual manner to secure tire 12 to the wheel. The braking mechanism (not shown) is carried by inner rim member 14 and is referred to herein only for purposes of determining relative location since the brakes per se do not constitute a part of the present invention.

Adjacent its tire engaging flange 19, outer rim member 13 is provided with a passageway 21 communicating with the interior cavity of tire 12. Passageway 21 serves to accommodate the fusible adapter of the present invention which is indicated in the drawings by the numeral 23. Internal threads 22 in passageway 21 provide the means for attachment of the fusible adapter 23 to outer wheel rim member 13. Adapter 23 comprises a hexagonal body 24 having an integral exteriorly threaded cylindrical projection 25 extending axially from its lower end to be screw threadedly engaged with mating threads 22 of passageway 21. Providing body 24 with an hexagonal form permits the ready mounting and securement of adapter 23 within the threaded portion of through passageway 21 as by means of a wrench. A usual O ring gasket 26 encircles projection 25 and is positioned between shoulder 27 of body 24 of adapter 23 and a shoulder on outer wheel member 13 to effect sealing around projection 25. Adapter 23 is provided with an axial passageway 28 which extends from within body 24 and for the length of projection 25 and opens through the bottom end of projection 25 for communication with passageway 21 of outer wheel rim member 13 and therethrough for communication with the interior of the tire 12. Passageway 28 is axially aligned with and at its inner end opens into an enlarged internally threaded bore 29 provided in body 24. Bore 29 extends longitudinally to and opens through the top end of body 24 to permit threaded attachment of a usual tire inflation valve assembly 30. Valve assembly 30 is of standard construction and is readily commercially available. It is understood that its particular construction does not form a part of this invention. It includes the usual valve core 30a operatively arranged to permit passage of air in usual manner into the tire and normally acting to prevent its escape. The threaded portion of passageway 21 of rim member 13 is of the same diameter as passageway 29 of adapter 23 and is adapted to accommodate a tire valve 30 in the event that the adapter 23 is desired to be removed for repair or other reason.

Body 24 adjacent its lower end, is provided with a transverse passageway 31 opening to atmosphere at one end and communicating with passageway 28 at its opposite end. Passageway 31, as shown, is substantially cone-shaped having defining walls which diverge in the direction of passageway 28. A fusible element 32 is appropriately firmly seated, as by press fitting, in passageway 31 to block it and prevent escape of air from tire 12. Fusible element 31 is formed of a suitable material, such as a metal alloy, designed to melt within a temperature range substantially below the critical failure/yield temperature of the cord material of tire 21 in order to unblock passageway 28 to permit escape of air therethrough and thereby prevent a blowout. The particular material composing fusible element 32 is not a part of the present invention since a wide variety of commercially available metals are suitable for the purpose of the present invention. It has been found that an alloy composed of tin and lead similar to commercial solder may be used. To permit replacement of a fusible element 32, after a melting has occurred, body 24 is transversely bored, as at 33, opposite passageway 31 and is internally threaded to receive a threaded plug 34 to block bore 32 after insertion of fusible element 32. Bore 33 further serves as a manufacturing expedient in the boring of the tapered walls of passageway 31.

Referring to FIGURE 1 of the drawings, it is noted that three fusible adapters 23 are illustrated and these are spaced approximately 120 degrees apart. The additional two adapters are provided as a convenient means of properly balancing wheel assembly 10. Obviously only one of the adapters 23 need be equipped with a tire inflation valve 30. The other adapters may be provided with a usual screw threaded plug (not shown) in lieu of tire inflation valve 30. However, it is desirable to have all adapters equipped with a fusible element 32 as hereinbefore described for the added safety factor thereby afforded.

Operation of fusible adapter 23 is dependent upon the heat conducted to fusible element 32 rather than on excessive tire pressure. Heat conducted from the brake assembly which is carried by inner wheel rim member 14 is conducted across flanges 17 and 16 into outer wheel member 13 and subsequently into fusible element 32 through adapter body 24. When the temperature of fusible element 32 becomes elevated to the melting point thereof and attains a fluid state it is obvious that the pressurized air in tire 12 can discharge to atmosphere through passageways 21, 28, and 31 carrying the fluid metal of fusible element 32 with it.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. In combination, an automatic tire venting device and a wheel having a tire mounted thereon, said wheel having a through passageway communicating with the interior of said tire, said venting device comprising a body mounted in said through passageway, said body having a passageway communicating with the interior of said tire, said latter passageway having communication also with the atmosphere, and a fusible means positioned in said body to seal off communication of said latter passageway to atmosphere, said fusible means being metallic and having a fusion temperature substantially below the deterioration temperature of said tire.

2. In combination, an automatic tire venting device and a wheel having a tire mounted thereon, said wheel having a through passageway communicating with the interior of said tire, said venting device comprising a body mounted in said through passageway, said body having a first passageway communicating by way of said through passageway of said wheel with the interior of said tire, and the atmosphere, said body having a second passageway communicating between said first passageway and the atmosphere, and a fusible means sealably positioned within said second passageway to prevent escape of air from within said tire to atmosphere, said fusible means being of a metallic material and having a fusion temperature substantially below the yield temperature of said tire.

3. In combination, a heat operative tire venting device and a wheel having a tire mounted thereon, said wheel having a through passageway communicating with the interior of said tire for passage of air into and from said tire, said venting device comprising a body mounted in said through passageway, said body having a first passageway communicating by way of said through passageway of said wheel with the interior of said tire and the atmosphere, said body having a second passageway with diverging walls communicating with and extending generally transversely from said first passageway to the atmosphere, a fusible means sealably positioned within said generally transversely extending second passageway to prevent escape of air from within said tire to atmosphere, said fusible means being of a metallic material and having a fusion temperature substantially below the ultimate tensile strength temperature of said tire, said body having a third passageway communicating with and extending generally transversely from said first passageway to the atmosphere and being positioned opposite said second passageway to permit access thereto, and a removable plug member for closing said third passageway.

4. In combination, a heat operative tire venting device and a wheel having a tire mounted thereon, said wheel having a through passageway communicating with the interior of said tire for passage of air into and from said tire, said venting device comprising a body mounted in said through passageway, said body having a first passageway extending within said body and communicating at one end with said through passageway of said wheel and opening to atmosphere at its other end, said body adapted to mount a valve assembly at said other end of said first passageway of said body, said body having a second passageway communicating with and extending from said first passageway of said body to atmosphere, and a fusible means sealably positioned within said second passageway to prevent escape of air from within said tire to atmosphere, said fusible means being metallic and having a fusion temperature substantially below the failure temperature of said tire.

5. In combination, a heat operative tire venting device and a wheel having a tire mounted thereon, said wheel having a through passageway communicating with the interior of said tire for passage of air into and from said tire, said venting device comprising a body mounted in said through passageway, said body having an axial passageway extending from within said body to communication with the interior of said tire, said body having an axial bore in connection with said axial passageway and extending to atmosphere, said axial bore adapted to mount a valve assembly, said body having another passageway in communication with said axial passageway and extending to atmosphere, a fusible means sealably positioned within said another passageway to prevent escape of air from within said tire to atmosphere, said fusible means being of a metallic material and having a fusion temperature substantially below the deterioration temperature of said tire, said body having a passageway positioned in alignment with said another passageway to permit access thereto and also having communication with said axial passageway and extending to atmosphere, and a removable plug member for closing said aligned passageway.

6. In combination, a heat operative tire venting device and a wheel having a tire mounted thereon, said wheel having a through passageway communicating with the interior of said tire for passage of air into and from said tire, said venting device comprising a body of hexagonal shape in cross-section having an integral projecting portion axially extending from one end of said body and removably mounted in said through passageway, said body having an axial passageway extending from within said body and through said projecting portion to communication with said through passageway of said wheel, said body having an axial bore in connection with said axial passageway and extending to atmosphere, said axial bore adapted to mount a valve assembly, said body having a passageway communicating with said axial passageway and extending transversely therefrom to open to atmosphere, and a fusible means sealably positioned within said transversely extending passageway to prevent escape of air from said tire to atmosphere, said fusible means being of a metallic material and having a fusion temperature substantially below the ultimate tensile strength temperature of said tire.

References Cited by the Examiner

UNITED STATES PATENTS

| | | | |
|---|---|---|---|
| 2,001,686 | 5/35 | Moore et al. | 137—74 X |
| 2,056,064 | 9/36 | Fenton | 152—427 |
| 2,608,235 | 8/52 | Wyman | 152—427 |
| 2,633,889 | 4/53 | Vignini | 152—417 |
| 2,855,015 | 10/58 | Atkin. | |

FOREIGN PATENTS

| | | |
|---|---|---|
| 1,019,339 | 10/52 | France. |
| 434,868 | 5/48 | Italy. |

ARTHUR L. LAPOINT, *Primary Examiner.*

RICHARD A. DOUGLAS, JACOB A. MANIAN,
*Examiners.*